United States Patent [19]

Musso, Jr.

[11] Patent Number: 5,800,014
[45] Date of Patent: Sep. 1, 1998

[54] ADJUSTABLE CHILD SEAT FOR BICYCLES

[76] Inventor: Anthony F. Musso, Jr., 1700 SE. Ranch Rd., Jupiter, Fla. 33478

[21] Appl. No.: 814,441

[22] Filed: Mar. 10, 1997

[51] Int. Cl.$^6$ ..................................................... B60N 2/26
[52] U.S. Cl. ................... 297/243; 297/195.13; 280/202; 224/415; 224/420
[58] Field of Search ........................... 297/243, 440.11, 297/250.1, 423.38, 452.2, 440.24, 452.4, 195.12, 195.13, 487, 488; 224/215, 420; 280/202

[56] References Cited

U.S. PATENT DOCUMENTS

| 441,485 | 11/1890 | Greenwood | 224/415 X |
|---|---|---|---|
| 450,712 | 4/1891 | Voss | 280/202 |
| 453,212 | 6/1891 | Sager | 280/202 |
| 530,160 | 12/1894 | Coulson | 224/415 X |
| 547,102 | 10/1895 | Williams | 297/195.13 X |
| 551,068 | 12/1895 | Wilson | 224/415 X |
| 556,951 | 3/1896 | Williams et al. | 224/415 X |
| 615,106 | 11/1898 | Satterwaite | 297/243 X |
| 615,756 | 12/1898 | Shackelton | 224/415 |
| 622,500 | 4/1899 | Kuster | 280/202 |
| 843,094 | 2/1907 | Paterson et al. | 280/202 |
| 903,290 | 11/1908 | Jahnel et al. | 297/243 X |
| 1,413,530 | 4/1922 | Harned | 224/420 X |
| 2,321,752 | 6/1943 | Kerr | 280/202 |
| 3,403,878 | 10/1968 | Opay | 224/420 X |
| 3,544,158 | 12/1970 | Timms | 280/202 X |
| 3,738,704 | 6/1973 | Smith et al. | 297/195.13 |
| 3,743,321 | 7/1973 | Luschen | 280/202 |
| 3,902,737 | 9/1975 | Berger et al. | 280/202 |
| 5,104,188 | 4/1992 | Jefferson | 297/243 X |
| 5,330,215 | 7/1994 | Bishaf et al. | 297/243 X |

FOREIGN PATENT DOCUMENTS

| 232800 | 8/1987 | European Pat. Off. | 297/195.13 |
|---|---|---|---|
| 111429 | 2/1943 | Sweden | 280/202 |
| 27953 | 12/1896 | United Kingdom | 280/202 |

Primary Examiner—Peter M. Cuomo
Assistant Examiner—Rodney B. White
Attorney, Agent, or Firm—McHale & Slavin, P.A.

[57] ABSTRACT

A children's bicycle seat for positioning of a child behind the handlebars of a conventional bicycle. The child's bicycle seat includes a pair of handlebar clamps and a handlebar support post bracket for securing a main frame structure to the handlebar of the bicycle in a three point stance. The upper frame member is adjustable in a horizontal plane allowing for the secure positioning of a children from nine months to four years of age. Adjustable foot supports also accommodate the various sized children that are positioned within the seat. The seating structure is formed from a single piece of fabric having preformed apertures allowing securement to the frame when the frame is in a disassembled state. The seat is attached to foot supports to prevent the child's legs from impacting the rotating wheel.

20 Claims, 2 Drawing Sheets

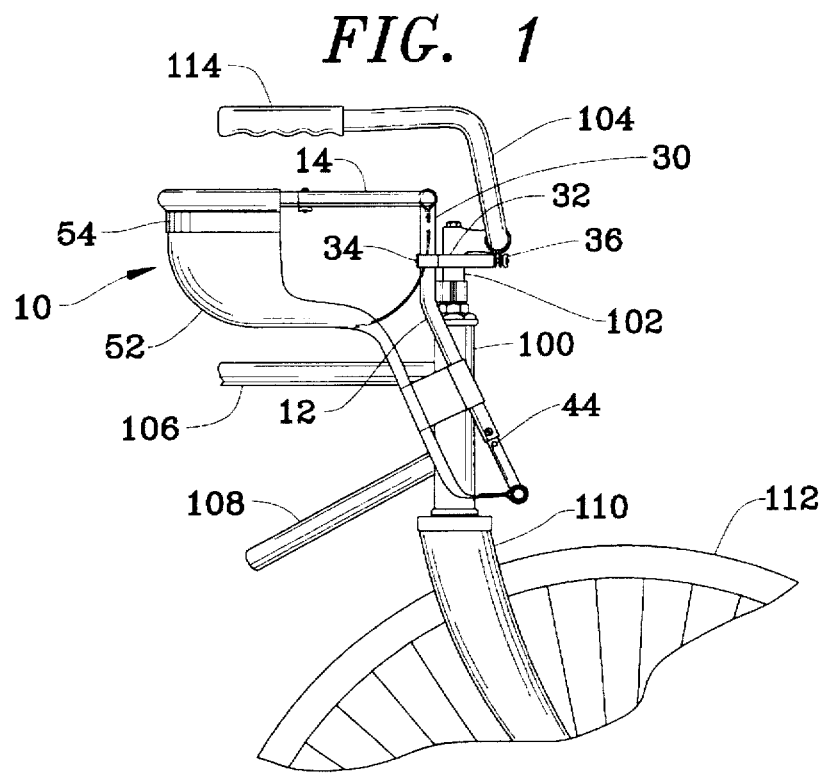
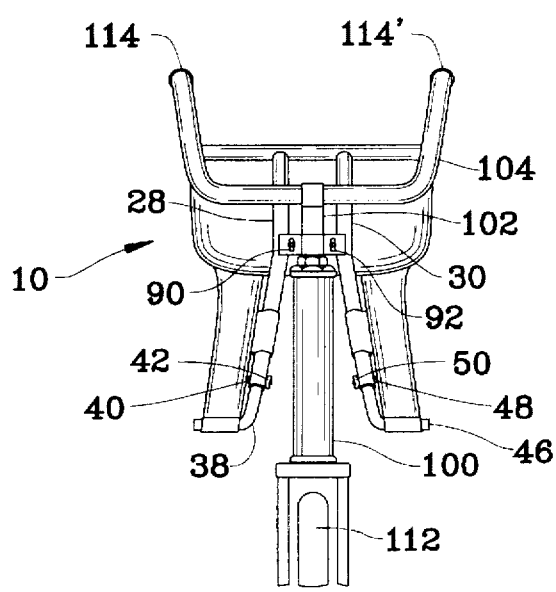
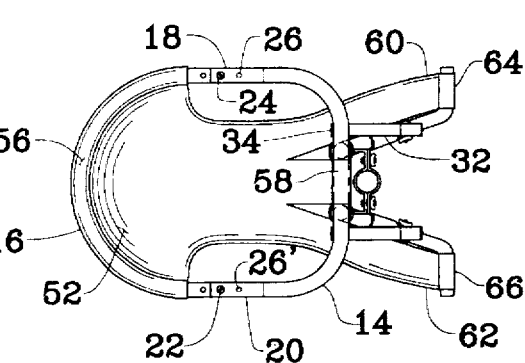

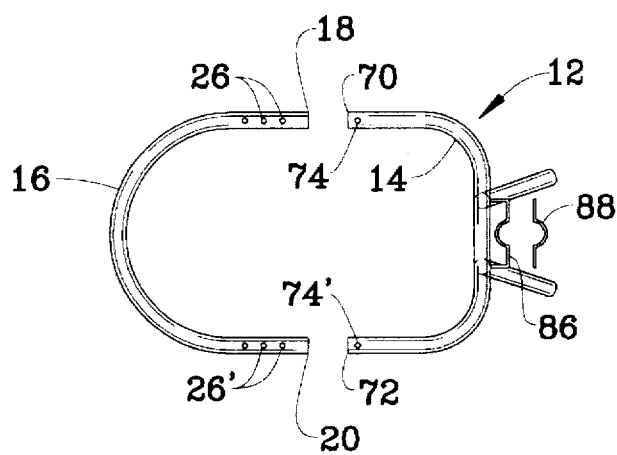
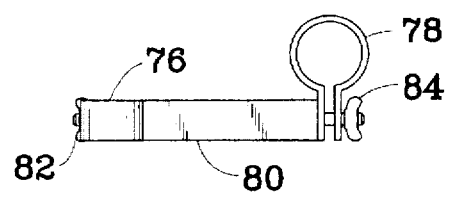
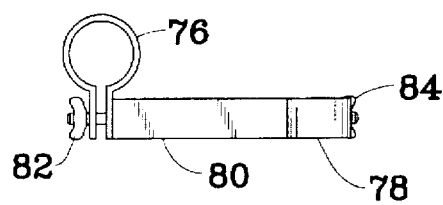
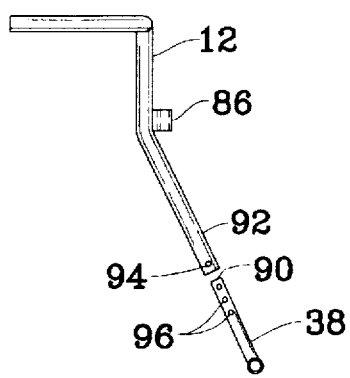
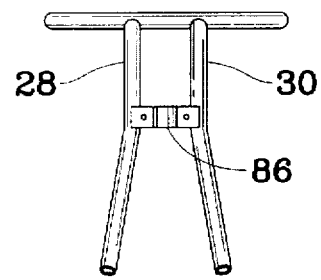
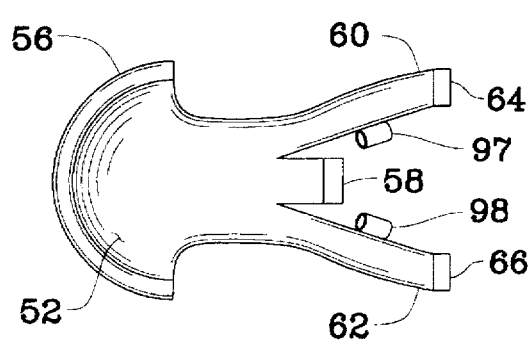
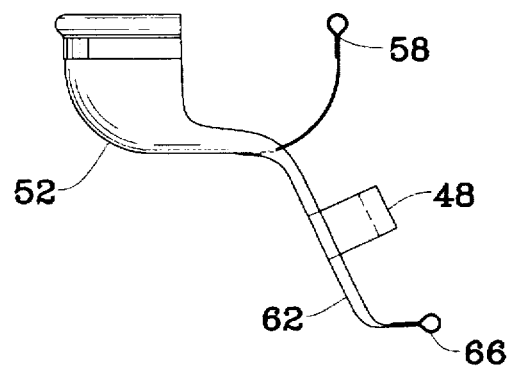

ADJUSTABLE CHILD SEAT FOR BICYCLES

FIELD OF THE INVENTION

This invention relates to bicycle safety and in particular to a child bicycle seat that attaches to the handlebars of a bicycle for positioning the child behind the handlebars.

BACKGROUND OF THE INVENTION

Child seats for use on a bicycle are well known devices used to secure a child in a predefined position while the bicycle is in operation. Child seats employ various configurations for either positioning a child in front of, or behind, the bicycle driver. Positioning a child behind the adult inhibits the bicycle driver from maintaining a vigilant eye on the status of the child. Should the bicycle driver turn their body into such a position to allow viewing of the child, the turn could cause an accident. Placement of a child in front of the adult, allows the adult to view the child but can cause an imbalance to the bicycle if the child is placed in front of the handlebars which places a weight over the steering tire. The placement of a child in front of the adult, but behind the handlebars, has been a more generally accepted position.

The placement of a child behind the handlebars allows for a number of advantages including placement of the child in a more central location for better weight distribution. In addition, the child is protected from minor impacts in light of the related steering post components. Further, the adult can maintain a direct vigilance on the child, as the adult and child are positioned at a close proximity.

A number of child seats currently attached to the handlebars or related steering components is known. Swedish Patent 111,429 discloses a bicycle seat for a child that attaches to the steering post. A first bracket hooks over the steering arm, and a second bracket forms a cantilevered bracket off the steering post. The seat is cushioned by a plurality of springs, and an angle of adjustment is provided by a lever lock which provides tilting of the seat in accordance with the weight of the child.

Swedish Patent 113,086 discloses yet another child seat that hooks to the steering arms of a bicycle and includes a U-shaped bracket that is positionable around the steering post so as to maintain the seat in a horizontal position. Bracketry extends from the seat for support of the child's legs.

U.S. Pat. No. 453,212 discloses a child seat which is fastened to a rod clamp member used to mount the main bicycle seat. The patent discloses the use of a curved fabric portion forming a sling between a transverse seat bar, attached to the folded rod, and a transverse back bar held in place to the rear of the seat by a pair of curved rods. The seat attachment includes an adjustable length foot rest which extends forward from the ends of a seat bar.

U.S. Pat. No. 551,068 issued to Wilson discloses a seat for attachment to a bicycle. The patent discloses a flat wooden seat which is suspended horizontally by use of a wire framework. The wire framework includes a pair of loops which are rearward facing to slide over the handlebars and a lower central loop with a forward facing opening to slide over the steering column, extending upward from the front wheel pivot and mounted on the handle bars. This arrangement allows the framework to be easily slid and rotated into place, to be held there by the weight of the seat and by the weight of a child sitting in the seat. The attachment also includes a pair of looped straps extending downward to serve as foot supports. This device is impractical for small children as it is mounted high, leading to instability for the child.

U.S. Pat. No. 2,321,752 issued to Kerr discloses a seat for attachment to a bicycle formed from a sheet metal seat having a flat back. The bottom of the seat is attached to a formed rod which includes a pair of curved portions hooked over the handlebars of a bicycle in a downward formed loop bolted to an attachment bracket. The attachment bracket is bolted to the top of the steering column by use of a coupling rod. The front edge of the seat is bolted to a tubular frame shaped as an inverted "U" with a foot rest slidably mounted in the downward pointed legs of the frame. This attachment is also positioned high and may not be adjustable for different sized children.

U.S. Pat. No. 2,517,957 issued to Anderson discloses a child seat for attachment to a bicycle which includes a tube extending rearward from the top of the bicycle steering column. The front portion of the tube includes a slotted section which is clamped on the steering column by use of a single screw. The rear portion of the tube includes a vertical hole into which a conventionally shaped bike seat is clamped by use of a vertical shaft. The device includes a foot rest which folds downward and outward from a screw fastening point at the top and near the front of the tubular section. This device positions a child in an unstable position.

U.S. Pat. No. 3,544,158 issued to Timms discloses a child seat which can be used either on a bicycle or in an automobile. The seat includes a tubular frame which is formed into a rectangular shape excluding an opening in the front and lower "U" shaped strap member which presents an opening in the front of the device. A horizontal seat pad is fastened to a lower frame while a vertical backpack together with a child restraint belt is fastened to the upper frame. Mounting the device onto a bicycle employs the steering post of the bicycle which is clamped between a transverse metal strap and a curved strap, both of which extend between the top of the legs. This device is most complicated in its dual purpose for use as a bicycle carrier and car seat which makes it unduly complicated and expensive for the average consumer.

U.S. Pat. No. 3,743,321 issued to Luschen discloses yet another front mounted bicycle attachment device. This device utilizes an upper tubular frame and a lower "U" shaped metal strap member created by three vertical metal connecting straps. A seat cushion is fastened on top of the lower strap member and the front connecting straps extend downward to mount outward extending brackets as foot rests. This device is secured to the bicycle by a bracket fastened to the top of the bicycle steering column. This bracket includes a pair of upward and outwardly extending tabs with slots, into which hooked portions at the top of the front strap are coupled. A quick release clamp mounted on a metal strap extends at a lower point between the front straps which additionally clamp the attachment to a steering post. This device is fixed in relation to the steering handle and cannot be moved in order to accommodate larger children by movement of the device away from the steering arms.

U.S. Pat. No. 3,902,737 issued to Berger discloses a child seat for attachment to a bicycle which consists of a bracket that clamps around the steering post of a bicycle providing all rigidity from the steering post to a loop shaped bracket that supports a one-piece seat structure for positioning the child as well as the child's legs.

Thus, what is lacking in the art is a device capable of positioning a child safely in front of the adult that attaches to the steering arms and allows for ease of adjustment for positioning of the child both in relation to the steering post as well as the foot post. In addition, the device is made from material allowing for a lightweight compact device having a hook shaped mechanism so as to prevent accidental detachment of the seat from the bicycle.

SUMMARY OF THE INVENTION

The invention is a child bicycle seat having an adjustable frame which supports a cloth seating structure to provide a lightweight and comfortable seating area for a child between the ages of 9 months and 4 years old. The seat is securely fastened directly behind the handle bars by use of a steering post clamp handlebar locking clamp. The main frame of the seat may be adjusted both in a vertical and horizontal plane to accommodate most any handlebar configurations.

The bicycle seat structure includes a detachable substantially circular shaped upper support bracket forming an adjustable opening to accommodate children of various ages. The upper support bracket provides nearly a two inch longitudinal adjustment which is adjusted by use of a wing nut and carriage bolt.

A one-piece seat constructed from fabric or the like flexible material includes a plurality of support fitting apertures formed integral to the seat to allow for the secure attachment of the seat to the rigid frame of the structure. The apertures require placement of the upper support and foot supports through the apertures for use in forming of the seat. The material operates as a leg support to prevent the child's feet from coming in contact with the bicycle wheel.

Thus, an object of the instant invention is to disclose a low cost, lightweight, and fully adjustable child bicycle seat which securely locks to the handle bars of a conventional bicycle.

Still another object of the instant invention is to provide an adjustable seating area for the secure positioning of a child between the ages of nine months and four years old.

Yet another object of the instant invention is to disclose a telescoping foot adjustment that allows for positioning of a foot support.

Still another object of the instant invention is to provide a one-piece fabric seat that is securely fastened to the structure and includes a provision to guard the child's feet from contacting the bicycle wheel.

Yet still another object of the instant invention is to disclose a handlebar attachment that is adjustable in a vertical position so as to allow positioning of the structure above the rail support of a bicycle in a horizontally position to maintain a seat structure in a predefined elevation.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 is a side elevational view of a child seat of the instant invention fastened to a bicycle;

FIG. 2 is a front elevational view of the child seat of FIG. 1;

FIG. 3 is a top view of the child seat;

FIG. 4 is a top view of the main frame of the child seat;

FIG. 5 is a side view of FIG. 4;

FIG. 6 is a front view of FIG. 4;

FIG. 7 is a top view of the fabric seat structure of FIG. 1; and

FIG. 8 is a side view of FIG. 7.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Referring in general to FIGS. 1–3, set forth is a side elevational view of the adjustable child seat for bicycles 10 of the instant invention. The child seat 10 is coupled to a bicycle frame 100 having a handlebar support post 102 which secures handlebars 104 in a fixed position. The bicycle frame 100 typically includes an upper railing 106, lower railing 108, and front wheel support 110. Front wheel support 110 provides the support structure for the rotating wheel 112, all of which is used in steering the bicycle upon the rotation of handlebars 104, commonly held along the handgrip 114.

The seat 10 is formed from a main frame support 12 having a forward upper support 14 forming a U-shaped structure securable to rear upper support 16. The first end 18 and second end 20 of the rear upper support 16 accepts the insertion ends 70,72 of the forward upper support 14 in a nested arrangement. More specifically, the first and second ends 18,20 of the rear upper support 16 act as tubular receptacles into which the insertion ends 70,72 are slid and secured.

The movement allows for adjustment and securement by use of carriage bolts 22 and 24 which may be placed into through holes 26. The spacial separation of the forward upper support 14 and rearward upper support 16 provides for an enlarged opening, further described later in this description, wherein placement of the carriage bolts 22 and 24 in one of the through holes which allows for the support of a child of approximately nine months. By movement of the carriage bolts 22 and 24 into the furthermost through hole, an enlarged opening is formed which is receptive to a child of approximately four years old.

The main frame support 12 includes a handlebar support clamp 32 which allows securement of the main frame to the handlebar 104. As will be described later in the specification, spacers 80 can be added or removed, as needed. The spacers 80 work in conjunction with a carriage bolt 34 to allow for proper vertical positioning of the main frame in relation to the steering support post 102. A wing nut 36 is attached to the end of the carriage bolt 34 and allows for ease of attachment of the main frame to the handlebars without tools.

The main frame 12 includes a left vertical support 28 and right vertical support 30. Left leg extension 38 couples to the left leg vertical support 28 by use of a carriage bolt 40 with wing nut 42 to allow for the placement of the left leg extension 38 along the vertical length of the left. vertical support. Similarly, the right vertical support 30 includes a right leg extension 46 having carriage bolt 48 and wing nut 50 for use in supporting the right leg extension 46 along the vertical length of the right vertical support 30. Each leg extension includes a raised tab to inhibit the outward movement of a child's foot. The tab further assists in maintaining the seat in a formed position.

The seat 52 is formed from a single piece of material having a plurality of apertures formed by the overlapping of the material for use in securing the seat to the frame, without the use of tools. The seat apertures are formed from overlapped material 54 that is secured in position by thread or the like permanent attachment means. A first seat aperture is formed along the rear section 56 of the rear upper support 16. The first seat aperture is receptive to the rear upper support member providing a backing support to the seat structure. The seat structure is further formed from an aperture placed over the forward upper support 14 along section 58 between the two handlebar mounts 30. In addition, leg portions 60 and 62 of the seat 52 include securement portions 64 and 66 which each encompass the lower leg extensions. The material providing a comfortable placement for the legs of the child while operating to prevent movement of the leg in a position that would allow contact with the rotating wheel 112.

Now referring in general to FIGS. 4-6, the main frame support structure 12 is further illustrated and defined as a forward upper support section 14 having a lower support portion being bifurcated as depicted by numerals 28 and 30. The lower support portions are positionable on each side of the steering post. The forward upper support portion 14 is operatively associated with the rearward upper support portion 16 which has a first end 18 and a second end 20 forming an outer tubular structure receptive to the insertion ends 70 and 72 of the forward support structure which each form an inner tubular structure slidably insertable into the rearward structure. Through hole 74 is alignable with one of the through holes 26 wherein placement of a carriage bolt into the through holes adjustably secures the rear upper support to the forward upper support. Depending upon the alignment of the through holes, the forward and rearward upper supports can be spacially positioned to allow for the securement of various sized children.

FIGS. 4A and 4B depict the first attachment means described as the handlebar attachment for securing the forward upper support to the handlebars of the steering mechanism. The attachment means consists of a first clamp 76 which is spaced apart from a second clamp 78 by a series of spacers 80. The spacers may be of any size allowing removal of one or more spacers to allow for the customization of the mount to a particular handlebar configuration. Carriage bolt 82 includes a wing nut 84 that secures the clamps 76 and 78 in a spaced-apart secure arrangement. In this manner, clamp 76 is placed over the forward upper support and clamp 78 is placed over the handle bar. Upon attachment of carriage bolt 82, the wing nut 84 securely fastens the forward upper support to the handle bars. During installation, or movement from one bicycle to another, a spacer 80 may be removed wherein the spatial distance between clamp 76 and 78 is decreased. The spacer may be saved for later use if another installation requires an additional space between the clamp so as to place the frame in a substantially vertical position. As shown in FIG. 4B, which is an alternative side view of 4A, the clamp 76 and 78 form a mirror image allowing for interchangeability.

FIG. 5 further illustrates the main frame support 12 to include a handlebar bracket 86, also shown in FIG. 4, which maintains the bifurcated lower support members in a spaced-apart position and allows for coupling of the main frame to the steering post. The handlebar bracket support 88 may be fastened to the handlebar bracket 86 by the use of a carriage bolts 91 and 91 thereby securing the lower portion of the main frame to the steering post. The handlebar clamp 32 and the handlebar bracket 86 provide a three point coupling stance for superior stability. The leg extension support 38 descends from the lower support portion of the main frame and includes a tubular shaped upper portion 90 which is slidably insertable into the distal end 92 of the bifurcated structure. Through hole 94 is available for alignment with one of the through holes 96 of the leg extension, thereby allowing for a full adjustment of the leg extension in relation to the main frame to accommodate the various size legs of the child placed within the seat. As previously mentioned, a carriage bolt may be placed into the through hole for securement of the leg extension in a predetermined position.

Now referring to FIG. 7, set forth is a seat 52 which is formed of a single piece of material having a rearward aperture 56 formed by taking a portion of the seat material and forming the aperture by sewing the fabric together providing a continuous loop for placement of the rearward upper support. Similarly, leg portion 60 includes an attachment area 64 as well as leg portion 62 having attachment area 66. Center portion 58 includes an attachment portion for securement of the seat to the front upper support. Extension 60 includes a side support 97 which secures to the leg extension and placed at such a position so as to encompass the mounting bolts to prevent scratching of the child as well as leg extension 62 having attachment 98 providing duplicate function. As shown in FIG. 8, the seat 52 forms a cup shape so as to protect the child from sliding backwards or forwards with leg portion 62 extending downward for support of the leg in prevention of the leg from engaging the wheel. The bicycle seat is modular in construction allowing for compact shipping and ease of assembly. The seat material is light weight and easily washed, if soiled, or replaced if necessary.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A children's bicycle seat for attachment to the steering mechanism on a full sized bicycle, said steering mechanism having a steering post rotatably mounted in a frame support with handlebars extending therefrom, said bicycle seat comprising:

a main frame support structure having a forward upper support portion and a lower support portion;

a rear upper support adjustably secured to said forward upper support portion;

first and second leg extension supports descending from and adjustably secured to said lower support portion;

first attachment means for attaching said forward upper support portion of said main frame support structure to said handlebars of said steering mechanism;

second attachment means for attaching said lower support portion of said main frame support structure to said steering post of said steering mechanism; and a seat coupled to said rear upper support, said forward upper support portion of said main frame support structure, and said first and second leg extension supports.

2. The bicycle seat according to claim 1 wherein said main frame support structure includes a bifurcated structure disposed on each side of said steering post for coupling to said first and second leg extension supports.

3. The bicycle seat according to claim 2 wherein said first and second leg extension supports have a tubular shaped upper portion slidably insertable into said bifurcated structure, said leg extension supports including at least one through hole receptive to a fastening means for engagement to said bifurcated structure.

4. The bicycle seat according to claim 1 wherein said first and second leg extension supports include a footrest bracket coupled to and extending perpendicular from each said leg extension support.

5. The bicycle seat according to claim 4 wherein each said footrest bracket includes a raised tab located along a distal end, said raised tab inhibits foot movement and secures a portion of said seat to said bracket.

6. The bicycle seat according to claim 1 wherein said first attachment means includes a spaced-apart pair of clamps for engaging said forward upper portion of said main frame and said handlebars.

7. The bicycle seat according to claim 6 wherein a distance between said clamps is maintained by at least one spacer disposed between said clamps.

8. The bicycle seat according to claim 1 wherein said second attachment means includes a fastening bracket for placement around said steering post operatively associated with a mounting bracket secured to said main frame, wherein said fastening bracket is coupled to said mounting bracket for securing said lower support portion of said main frame to said steering post.

9. The bicycle seat according to claim 1 wherein said seat is constructed from a single piece of flexible material having an integral attachment means for securing said seat to said rear upper support, said forward upper support portion, and said first and second leg extension supports.

10. The bicycle seat according to claim 9 wherein said seat includes an attachment means for securing a portion of said seat to said lower support portion.

11. The bicycle seat according to claim 1 wherein said rear upper support is adjustably secured to said forward upper support portion, wherein said rear upper support and said forward upper support portion cooperate to form a contiguous sidewall allowing adjustment to accommodate the size of the child.

12. The bicycle seat according to claim 11 wherein a portion of said forward upper support portion forms an inner tubular structure slidably mounted within a portion of said rear upper support forming an outer tubular structure.

13. A children's bicycle seat for attachment to the steering mechanism on a full sized bicycle, said steering mechanism having a steering post rotatably mounted in a frame support with handlebars extending therefrom, said bicycle seat comprising:

a main frame support structure having a forward upper support portion and a lower support portion, said lower support portion being bifurcated and disposed on each side of said steering post;

a rear upper support adjustably secured to said forward upper support portion of said main frame structure;

first and second leg extension supports descending from said lower support portion, said leg extension supports having a tubular shaped upper portion slidably insertable into said lower support portion;

first means for adjustably securing said leg extension supports to said lower support portion of said main frame;

first attachment means for attaching said forward upper support portion of said main frame support structure to said handlebars of said steering mechanism;

second attachment means for attaching said lower support portion of said main frame support structure to said steering post of said steering mechanism; and a seat coupled to said rear upper support, said forward upper support portion, and said first and second leg extension supports, said seat constructed from a single piece of flexible material having an integral attachment means for securing said seat to said rear upper support, said forward upper support portion, and said first and second leg extension supports.

14. The bicycle seat according to claim 13 wherein said first means for adjusting is defined as a plurality of through holes receptive to a fastening bolt for adjustably positioning said leg extension support to said lower support portion of said main frame.

15. The bicycle seat according to claim 13 wherein said first and second leg extension supports include a footrest bracket coupled to and extending perpendicular from each said leg extension support.

16. The bicycle seat according to claim 13 wherein said first attachment means includes a spaced-apart pair of clamps for engaging said forward upper support portion of said main frame and said handlebars.

17. The bicycle seat according to claim 16 wherein a distance between said clamps is maintained by at least one spacer disposed between said clamps.

18. The bicycle seat according to claim 13 wherein said seat includes an attachment means for securing a portion of said seat to said lower support portion.

19. The bicycle seat according to claim 13 wherein said rear upper support is adjustably secured to said forward upper support portion, wherein said rear upper support and said forward upper support portion cooperate to form a contiguous sidewall allowing adjustment to accommodate the size of the child.

20. The bicycle seat according to claim 13 wherein a portion of said forward upper support portion forms an inner tubular structure slidably mounted within a portion of said rear upper support forming an outer tubular structure.

* * * * *